United States Patent
White et al.

(10) Patent No.: US 6,531,982 B1
(45) Date of Patent: *Mar. 11, 2003

(54) FIELD UNIT FOR USE IN A GPS SYSTEM

(75) Inventors: Stanley A. White, San Clemente, CA (US); Kenneth S. Walley, Portola Hills, CA (US); James W. Johnston, Rancho Santa Margarita, CA (US); P. Michael Henderson, Tustin, CA (US); Kelly H. Hale, Aliso Viejo, CA (US); Warner B. Andrews, Jr., Boulder, CO (US); Jonathan I. Siann, San Diego, CA (US)

(73) Assignee: SiRF Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,051

(22) Filed: Sep. 30, 1997

(51) Int. Cl.⁷ ............................ H04B 7/185; G01S 5/02
(52) U.S. Cl. .............................. 342/357.09; 342/357.1; 342/357.13; 701/213
(58) Field of Search .................. 342/357.09, 357.1, 342/357.13; 701/213

(56) References Cited

U.S. PATENT DOCUMENTS

| | | | |
|---|---|---|---|
| 3,604,911 A | 9/1971 | Schmitt | 235/181 |
| 3,975,628 A | 8/1976 | Graves et al. | 250/199 |
| 4,426,712 A | 1/1984 | Gorski-Popiel | 375/96 |
| 4,445,118 A | 4/1984 | Taylor et al. | 343/357 |
| 4,463,357 A | 7/1984 | MacDoran | 343/460 |
| 4,578,678 A | 3/1986 | Hurd | 343/357 |
| 4,667,203 A | 5/1987 | Counselman, III | 342/357 |
| 4,701,934 A | 10/1987 | Jasper | 375/1 |
| 4,754,465 A | 6/1988 | Trimble | 375/1 |
| 4,785,463 A | 11/1988 | Janc et al. | 375/1 |
| 4,809,005 A | 2/1989 | Counselman, III | 342/352 |
| 4,821,294 A | 4/1989 | Thomas, Jr. | 375/96 |
| 4,890,233 A | 12/1989 | Ando et al. | 364/457 |
| 4,894,662 A | 1/1990 | Counselman | 342/357 |
| 4,894,842 A | 1/1990 | Broekhoven et al. | 375/1 |
| 4,992,720 A | 2/1991 | Hata | 320/23 |
| 4,998,111 A | 3/1991 | Ma et al. | 342/352 |
| 5,014,066 A | 5/1991 | Counselman, III | 342/352 |
| 5,018,088 A | 5/1991 | Higbie | 364/574 |
| 5,036,329 A | 7/1991 | Ando | 342/357 |
| 5,043,736 A | 8/1991 | Darnell et al. | 342/357 |

(List continued on next page.)

FOREIGN PATENT DOCUMENTS

| | | |
|---|---|---|
| EP | 0511741 A1 | 11/1992 |
| EP | 0511741 B1 | 11/1992 |
| EP | 0639901 A2 | 2/1995 |
| EP | 0639901 A3 | 2/1995 |
| JP | 08/065205 A | 3/1996 |
| JP | 08/065205 | 3/1996 |
| WO | WO 92/13392 | 8/1992 |
| WO | WO 00/19644 | 4/2000 |

*Primary Examiner*—Theodore M. Blum
(74) *Attorney, Agent, or Firm*—Thomas, Kayden, Horstemeyer & Risley, LLP

(57) ABSTRACT

A system is provided for communicating location and other related information of a field unit to a remote base station. The field unit generates position signals based on signals received from communication with a plurality of GPS satellites. These position signals are transmitted to a remote base station, where they are processed and displayed. The field unit includes an environmental circuit having devices for determining an environmental condition and producing an environmental signal representative of the environmental condition. The environmental signal is also transmitted to the remote base station for processing and display. The field unit is also provided with a cellular link circuit for transmitting the position signals and the environmental signal to the remote base station via a cellular link.

77 Claims, 7 Drawing Sheets

U.S. PATENT DOCUMENTS

| | | | |
|---|---|---|---|
| 5,108,334 A | 4/1992 | Eschenbach et al. | 455/314 |
| 5,148,002 A * | 9/1992 | Kuo et al. | 219/211 |
| 5,148,042 A | 9/1992 | Nakazoe | 307/65 |
| 5,153,591 A | 10/1992 | Clark | 341/51 |
| 5,179,724 A | 1/1993 | Lindoff | 455/76 |
| 5,202,829 A | 4/1993 | Geier | 364/449 |
| 5,223,844 A * | 6/1993 | Mansell et al. | 342/457 |
| 5,225,842 A | 7/1993 | Brown et al. | 342/357 |
| 5,253,268 A | 10/1993 | Omura et al. | 375/1 |
| 5,276,765 A | 1/1994 | Fremman et al. | 395/2 |
| 5,293,170 A | 3/1994 | Lorenz et al. | 376/309 |
| 5,293,398 A | 3/1994 | Hamao et al. | 375/1 |
| 5,297,097 A | 3/1994 | Etoh et al. | 365/226 |
| 5,311,195 A | 5/1994 | Mathis et al. | 342/357 |
| 5,323,164 A | 6/1994 | Endo | 342/357 |
| 5,343,209 A | 8/1994 | Sennott et al. | 342/357 |
| 5,345,244 A | 9/1994 | Gildea et al. | 342/357 |
| 5,347,536 A | 9/1994 | Meehan | 375/1 |
| 5,352,970 A | 10/1994 | Armstrong, II | 320/39 |
| 5,363,030 A | 11/1994 | Ford et al. | 320/13 |
| 5,378,155 A | 1/1995 | Eldridge | 434/11 |
| 5,379,224 A | 1/1995 | Brown et al. | 364/449 |
| 5,396,515 A | 3/1995 | Dixon et al. | 375/208 |
| 5,402,346 A | 3/1995 | Lion et al. | 364/436 |
| 5,402,347 A | 3/1995 | McBurney et al. | 364/443 |
| 5,410,747 A | 4/1995 | Ohmagari et al. | 455/118 |
| 5,416,712 A | 5/1995 | Geier et al. | 364/450 |
| 5,418,818 A | 5/1995 | Marchetto | 375/264 |
| 5,420,593 A | 5/1995 | Niles | 342/357 |
| 5,440,313 A | 8/1995 | Osterdock et al. | 342/352 |
| 5,450,344 A | 9/1995 | Woo et al. | 364/449 |
| 5,497,149 A * | 3/1996 | Fast | 340/988 |
| 5,498,239 A | 3/1996 | Galel et al. | 604/95 |
| 5,504,684 A | 4/1996 | Lau et al. | 364/443 |
| 5,546,445 A | 8/1996 | Dennison et al. | 379/60 |
| 5,548,613 A | 8/1996 | Kahu et al. | 375/208 |
| 5,550,811 A | 8/1996 | Kahu et al. | 370/18 |
| 5,568,473 A | 10/1996 | Hemmati | 370/18 |
| 5,577,023 A | 11/1996 | Marum et al. | 370/16 |
| 5,592,173 A | 1/1997 | Lau et al. | 342/357 |
| 5,594,453 A | 1/1997 | Rodal et al. | 342/357 |
| 5,608,722 A | 3/1997 | Miller | 370/320 |
| 5,623,485 A | 4/1997 | Bi | 370/209 |
| 5,625,668 A | 4/1997 | Loomis et al. | 379/58 |
| 5,640,429 A | 6/1997 | Michaels et al. | 375/340 |
| 5,640,431 A | 6/1997 | Bruckert et al. | 375/344 |
| 5,642,377 A | 6/1997 | Chung et al. | 375/200 |
| 5,644,591 A | 7/1997 | Sutton | 375/200 |
| 5,649,000 A | 7/1997 | Lee et al. | 455/436 |
| 5,650,792 A | 7/1997 | Moore et al. | 343/725 |
| 5,654,718 A | 8/1997 | Beason et al. | 342/357 |
| 5,663,734 A | 9/1997 | Krasner | 342/357 |
| 5,663,735 A | 9/1997 | Eshenbach | 342/357 |
| 5,689,814 A | 11/1997 | Hagisawa et al. | 455/69 |
| 5,720,770 A * | 2/1998 | Nappholz et al. | 607/30 |
| 5,722,061 A | 2/1998 | Hutchison, IV et al. | 455/245.1 |
| 5,734,674 A | 3/1998 | Fenton et al. | 375/207 |
| 5,734,966 A | 3/1998 | Farrer et al. | 455/63 |
| 5,737,329 A | 4/1998 | Horiguchi | 370/342 |
| 5,739,596 A | 4/1998 | Takizawa et al. | 307/66 |
| 5,742,233 A * | 4/1998 | Hoffman et al. | 340/573 |
| 5,749,067 A | 5/1998 | Barrett | 704/233 |
| 5,752,976 A * | 5/1998 | Duffin et al. | 607/32 |
| 5,781,156 A | 7/1998 | Krasner | 342/357 |
| 5,782,878 A * | 7/1998 | Morgan et al. | 607/5 |
| 5,784,695 A | 7/1998 | Upton et al. | 455/442 |
| 5,786,789 A | 7/1998 | Janky | 342/357 |
| 5,812,087 A | 9/1998 | Krasner | 342/357 |
| 5,825,327 A | 10/1998 | Krasner | 342/357 |
| 5,828,694 A | 10/1998 | Schipper | 375/208 |
| 5,831,574 A | 11/1998 | Krasner | 342/357 |
| 5,832,021 A | 11/1998 | Kondo | 375/200 |
| 5,841,396 A | 11/1998 | Krasner | 342/357 |
| 5,845,203 A | 12/1998 | LaDue | 455/414 |
| 5,854,605 A | 12/1998 | Gildea | 342/357 |
| 5,862,465 A | 1/1999 | Ou | 455/234.1 |
| 5,867,535 A | 2/1999 | Phillips et al. | 375/295 |
| 5,867,795 A | 2/1999 | Novis et al. | 455/566 |
| 5,872,540 A | 2/1999 | Casabona et al. | 342/362 |
| 5,874,914 A | 2/1999 | Krasner | 342/357 |
| 5,877,724 A | 3/1999 | Davis | 342/357 |
| 5,877,725 A | 3/1999 | Kalafus | 342/357 |
| 5,881,371 A | 3/1999 | Reynolds | 455/83 |
| 5,883,594 A | 3/1999 | Lau | 342/357 |
| 5,884,214 A | 3/1999 | Krasner | 701/207 |
| 5,889,474 A | 3/1999 | LaDue | 340/825.49 |
| 5,903,654 A | 5/1999 | Milton et al. | 380/49 |
| 5,907,809 A | 5/1999 | Molnar et al. | 455/456 |
| 5,909,640 A | 6/1999 | Farrer et al. | 455/63 |
| 5,913,078 A * | 6/1999 | Kimura et al. | 396/50 |
| 5,917,444 A | 6/1999 | Loomis et al. | 342/357 |
| 5,917,829 A | 6/1999 | Hertz et al. | 370/479 |
| 5,920,283 A | 7/1999 | Shaheen et al. | 342/357 |
| 5,923,703 A | 7/1999 | Pon et al. | 375/209 |
| 5,924,024 A | 7/1999 | Ikeda et al. | 455/313 |
| 5,926,131 A | 7/1999 | Sakumoto et al. | 342/357 |
| 5,936,572 A | 8/1999 | Loomis et al. | 342/357 |
| 5,943,363 A | 8/1999 | Hanson et al. | 375/206 |
| 5,945,944 A | 8/1999 | Krasner | 342/357.06 |
| 5,956,328 A | 9/1999 | Sato | 370/335 |
| 5,956,664 A * | 9/1999 | Bryan | 702/184 |
| 5,963,582 A | 10/1999 | Stansell, Jr. | 375/200 |
| 5,970,084 A | 10/1999 | Honda | 375/200 |
| 5,977,909 A | 11/1999 | Harrison et al. | 342/357.09 |
| 5,982,324 A | 11/1999 | Watters et al. | 342/357.06 |
| 5,987,016 A | 11/1999 | He | 370/335 |
| 5,991,309 A | 11/1999 | Jensen et al. | 370/492 |
| 5,991,613 A | 11/1999 | Euscher et al. | 455/277.1 |
| 5,995,537 A | 11/1999 | Kondo | 375/208 |
| 5,999,124 A | 12/1999 | Sheynblat | 342/357.09 |
| 6,002,362 A | 12/1999 | Gudat | 342/357.03 |
| 6,002,363 A | 12/1999 | Krasner | 342/357.01 |
| 6,002,709 A | 12/1999 | Hendrickson | 375/206 |
| 6,009,551 A | 12/1999 | Sheynblat | 714/776 |
| 6,016,119 A | 1/2000 | Krasner | 342/357.06 |
| 6,023,462 A | 2/2000 | Nieczyporowicz et al. | 370/335 |
| 6,041,222 A | 2/2000 | Horton et al. | 455/255 |
| 6,047,016 A | 4/2000 | Ramberg et al. | 375/200 |
| 6,047,017 A | 4/2000 | Cahn et al. | 375/200 |
| 6,049,715 A | 4/2000 | Willhoff et al. | 455/436 |
| 6,052,081 A | 4/2000 | Krasner | 342/357.02 |
| 6,061,018 A | 5/2000 | Sheynblat | 342/357.06 |
| 6,064,336 A | 5/2000 | Krasner | 342/357.05 |
| 6,064,688 A | 5/2000 | Yanagi | 375/149 |
| 6,075,809 A | 6/2000 | Naruse | 375/147 |
| 6,104,338 A | 8/2000 | Krasner | 342/357.06 |
| 6,104,340 A | 8/2000 | Krasner | 342/357.1 |
| 6,107,960 A | 8/2000 | Krasner | 342/357.09 |
| 6,111,540 A | 8/2000 | Krasner | 342/357.1 |
| 6,131,067 A | 10/2000 | Girerd et al. | 701/213 |
| 6,133,871 A | 10/2000 | Krasner | 342/357.06 |
| 6,133,873 A | 10/2000 | Krasner | 342/357.12 |
| 6,133,874 A | 10/2000 | Krasner | 342/357.15 |
| 5,577,025 A | 11/2000 | Skinner et al. | 370/22 |
| 6,150,980 A | 11/2000 | Krasner | 342/357.1 |

\* cited by examiner

FIELD UNIT FOR USE IN A GPS SYSTEM

FIELD OF THE INVENTION

This invention relates generally to the field of wireless communications, and particularly to a system and method for communicating with, and for monitoring the location and other environmental characteristics of, a Global Positioning System (GPS) receiver.

BACKGROUND OF THE INVENTION

The Department of Defense developed the Global Positioning System (GPS) to accurately determine the location of a receiver near the surface of the earth. The GPS employs a constellation of 24 satellites that currently orbit the earth. These satellites were developed and built by the assignee of the present invention. These satellites serve as reference points and send radio signals that include information regarding the satellites' position, orbit and GPS time. A GPS receiver on the earth's surface can detect this information and, based on this information, can determine its position relative to the satellites. Therefore, GPS enables users anywhere in the world to determine their locations precisely by using a GPS receiver to interpret signals from the array of satellites. For example, GPS is used by military aircraft, commercial aircraft, trucking fleets, firefighters, law enforcement organizations, as well as by farmers, fishermen, hikers, and private pilots to fix locations and pinpoint targets. To many recreational users, GPS has increased the safety of many recreational pursuits by providing boaters, hikers, skiers, and others who are lost or in trouble with the ability to accurately pin-point their locations and to assist them in navigating their way out of trouble.

Presently, GPS receivers are embodied only in discrete end products, such as, simple hand-held receivers, navigation systems, and surveying equipment. These end products can be carried by the users or attached to the objects to be navigated or under surveillance. Some of these presently-available GPS receivers are even capable of transmitting basic distress or other signals that are accompanied by signals representing the location of the receiver. However, presently-available GPS receivers are still not able to engage in a more comprehensive dialog with a remote station to exchange location and other pertinent information. For example, presently-available GPS receivers cannot be interrogated by a remote station at a regular time interval, or at predetermined times, to determine the specific location of the GPS receiver. In addition, presently-available GPS receivers typically operate on a conventional RF (radio frequency) basis, and therefore cannot communicate in any manner with a remote station if the GPS receiver is out-of-range. In addition, presently-available GPS receivers do not communicate other information, such as variable and known environmental conditions, to other remote stations.

Accordingly, there remains a need for a system and method that allows a remote station to maintain active communication with a GPS receiver, as well as to monitor the location, the environmental measurements, and other related data of the GPS receiver.

SUMMARY OF THE INVENTION

The field unit for use in a GPS system provides for a system and method for communicating location and other related information of a field unit to a remote base station. The field unit generates position signals based on signals received from communication with a plurality of GPS satellites. These position signals are transmitted to a remote base station, where they are processed and displayed.

In accordance with one aspect of the field unit, the field unit includes an environmental circuit having devices for determining an environmental condition and producing an environmental signal representative of the environmental condition such as ambient temperature, altitude, pressure and/or humidity. Environmental conditions may also include physical characteristics of a living individual, such as a person or an animal, carrying the field unit. The environmental signal is also transmitted to the remote base station for processing and display. The environmental signal can contain variable information if the environmental condition is a changing condition, or can contain known or predetermined information.

In accordance with another aspect of the field unit, the field unit is capable of communicating information to the remote base station even if the field unit is outside the RF transmission range. The field unit is provided with a cellular link circuit for transmitting the position signals and the environmental signal to the remote base station via a cellular link.

In accordance with yet another aspect of the field unit, the base station interrogates the field unit at predetermined times, or after predetermined time intervals, to cause the field unit to communicate information to the base station. The base station includes an interrogation circuit for generating an interrogation signal, and the field unit includes a receiver for receiving the interrogation signal.

In accordance with a further aspect of the field unit, the field unit is capable of communicating information to the remote base station at predetermined times, or after predetermined time intervals, even without the receipt of an interrogation signal. In this embodiment, the field unit further includes a controller, and a timer coupled to the controller for initiating operation of the field unit. This embodiment is best suited for utilizing an active power management scheme to conserve power.

The field unit can be implemented in the form of a thin strip of mylar-like material for use in low-cost applications. Since the position and environmental signals are processed at the remote base station, minimal processing is performed at the field unit and it can therefore be provided for use in low-cost applications.

BRIEF DESCRIPTION OF THE DRAWINGS

The field unit can be better understood with reference to the following figures. The components in the figures are not necessarily to scale, emphasis instead being placed upon clearly illustrating the principles of the field unit. Moreover, in the figures, like reference numerals designate corresponding parts throughout the several views.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known, devices and circuits are omitted so as to not obscure the description of the present invention with unnecessary detail.

Figure 1:
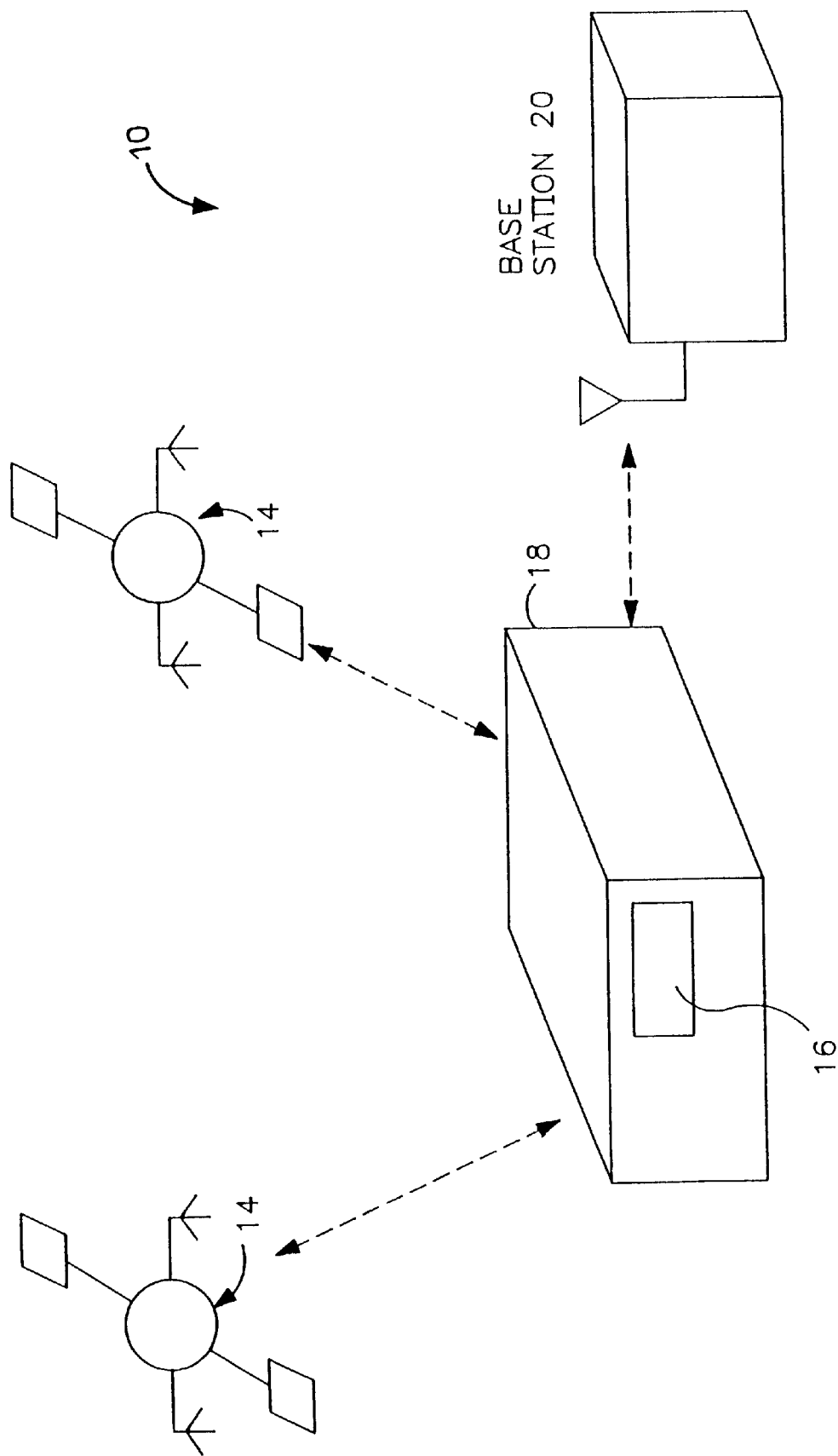
FIG. 1 is a simplified block diagram illustrating a system according to the present invention.

FIG. 1 is a simplified block diagram of a system 10 according to the present invention. The system 10 configured in accordance with the present invention includes a plurality of satellites 14, an interactive field unit 16, and at least one base station 20. The interactive field unit 16 can be attached to or carried by an object 18 that is being tracked. The satellites 14 are configured to communicate location information to the field unit 16. In a non-limiting example, the satellites 14 may be NAVSTAR satellites that transmit at 1.575 GHz. Each satellite 14 employs one of thirty-two independent clear acquisition (C/A) codes to create a spread spectrum location system.

The field unit 16 of the present invention can function as a conventional GPS receiver in determining its location based on information, such as latitude, longitude, altitude, and time, received from at least four of the satellites 14. The field unit 16 then transmits this location information to the base station 20. Preferably, the field unit 16 is configured to receive position information from the satellites 14, and to transmit this position information to the base station 20 where the transmitted information is processed to determine the location of the field unit 16. In addition to position information, the field unit 16 of the present invention is also adapted to communicate environmental information relating to the field unit 16 and/or its target object 18 to the base station 20. Such information can include, but is not limited to, variable information such as temperature, altitude, pressure and/or humidity at the location of the field unit 16, or varying physical characteristics of an individual on which the field unit 16 is carried, such as heart beat or blood pressure. The environmental information can also be programmed to include known or specific information about the object 18, such as name, contents, weight, destination, priority, etc. The base station 20 can then determine the position, velocity, and other characteristics relating to the field unit 16 and/or its object 18 based on the information received from the field unit 16.

The object 18 can be any object whose location is to be tracked, and can include but is not limited to packages sent by mail, containers or equipment being shipped from one location to another, and hikers, boaters and other individuals who are to be tracked by potential rescue agencies. The field unit 16 of the present invention can also be incorporated into credit-card size and wristband-mounted personal units, locators for children, pets, and vehicles (e.g., bicycles). Other applications for the present invention include tracking Federal Express packages; monitoring geological motion (e.g., determining whether a structure has physically moved due to ground movement); tracking and monitoring the physiology of animals in the wild; and tracking expensive on-loan objects (e.g., art pieces).

The system 10 of the present invention can operate in one of two separate modes. In a first mode of operation, the base station 20 interrogates the field unit 16 at predetermined times, or at predetermined time intervals, and the field unit 16 responds to the interrogation. In a second mode of operation, no interrogation signals are transmitted, by the base station 20 or any other remote station, and the field unit 16 is programmed to initiate communication with a base station 20 at predetermined times, or at predetermined time intervals.

If the field unit 16 is out of the range of the base station 20 to implement conventional RF communication, the field unit 16 can operate in the second mode by initiating communication with the base station 20 via a cellular or other data link which allows for communication over greater distances.

To determine the location of the field unit 16, the field unit 16 receives signals from at least four of the 24 satellites in orbit and measures the time elapsed from the time of transmission to the time of reception, and transmits this information to the base station 20. The base station 20 then determines the distance between the field unit 16 and each satellite 14 based on this timing information. The ephemeris data of each satellite 14 which have also been transmitted on the C/A code along with the time of transmission provides the satellite's position (X, Y, Z). The distance (D) between the satellite 14 and the field unit 16 is determined by the field unit 16 (acting as a GPS receiver) based on the measurement of the transit time for the signal from the satellite to the field unit 16. The position (x, y, z) of the field unit 16 and the local receiver clock bias (C) are determined from a system of four equations with four unknowns. Specifically, the system of equations to be solved is as follows:

$$(X1-x)^2+(Y1-y)^2+(Z1-z)^2=(D1-C)^2$$

$$(X2-x)^2+(Y2-y)^2+(Z2-z)^2=(D2-C)^2$$

$$(X3-x)^2+(Y3-y)^2+(Z3-z)^2=(D3-C)^2$$

$$(X4-x)^2+(Y4-y)^2+(Z4-z)^2=(D4-C)^2$$

where (X, Y, Z) are the position coordinates of the satellites 14, D is the measured distance between the receiver at the field unit 16 and the respective satellite 14, (x, y, z) are the position coordinates of the receiver at the field unit 16, and C is the clock bias. The solution of these equations is well known for any number of satellites greater than three.

Figure 2:
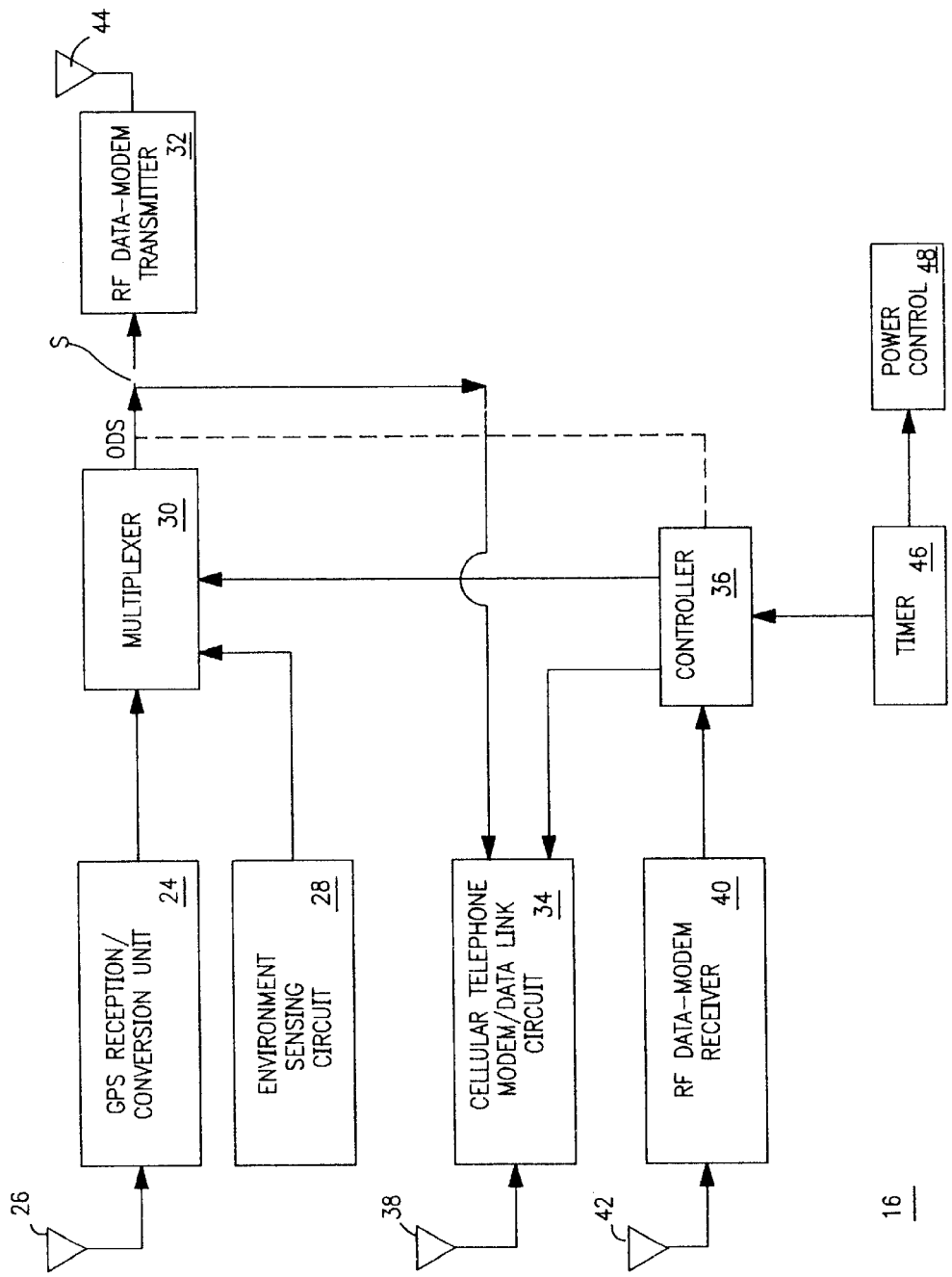
FIG. 2 is a simplified block diagram illustrating the field unit of FIG. 1 configured in accordance with one embodiment of the present invention.

FIG. 2 is a simplified block diagram illustrating the field unit 16 of the present invention configured in accordance with one embodiment of the present invention. The field unit 16 of the present invention includes a GPS reception/conversion unit 24 that down-converts the 1.575 GHz transmitted signal to an intermediate frequency (IF) signal, typically between 2–50 MHz. The GPS reception/conversion unit 24 provides the radio frequency (RF), intermediate frequency (IF), clock-generation, and analog to digital (ADC) functions and is described in greater detail in connection with FIG. 4 hereinbelow. An antenna 26 is also coupled to the GPS reception/conversion unit 24 for receiving the signals from the satellites 14.

It is important that any time-sensitive circuits be integrated into the field unit 16. However, once the signals have been converted into digital form, the digital values and their respective clocks can be transmitted to the base station 20 for further processing.

The field unit 16 further includes an environment sensing circuit 28 that detects and quantifies one or more environmental conditions. For example, the environment sensing circuit 28 can include one or more devices (such as transducers, sensors, and detectors) for measuring variable information such as temperature, altitude, pressure, humidity, and/or other environmental characteristics. The environment sensing circuit 28 can further include devices for measuring the varying physical characteristics of a living individual on which the field unit 16 is carried, such as heart beat and blood pressure. The environment sensing circuit 28 can even include a ROM that is pre-programmed to contain known and specific information about the object 18 to be tracked, such as name, contents, weight, destination, priority, etc. The information from the environment sensing circuit 28 is multiplexed by a multiplexer 30 into the output data stream ODS at an RF data-modem transmitter 32.

The field unit 16 further includes a cellular telephone modem/data link circuit 34 that allows the field unit 16 to communicate with the base station 20 or with an other remote station via a separate link that can operate across extended distances. As a non-limiting example, the cellular telephone modem/data link circuit 34 may be provided in the form of a conventional laptop-computer modem circuit utilized by cellular phones to transmit data information. The cellular telephone modem/data link circuit 34 is actuated by a controller 36, in the manner described below, to transmit the information of the output data stream ODS from the multiplexer 30 via an antenna 38 to the base station 20 or to another remote station via a cellular link. A switch S, controlled by the controller 36 (see dotted lines in FIG. 2), allows the multiplexer 30 to switch its output between the RF data-modem transmitter 32 and the cellular telephone modem/data link circuit 34.

The field unit 16 is also provided with an RF data-modem receiver 40 which receives interrogation and other "handshake" signals via an antenna 42 from a base station 20 that is attempting to initiate communication with the field unit 16. The RF data-modem receiver 40 is coupled to, and actuates, the controller 36 to cause the field unit 16 to transmit location and other information to the base station 20 in the manner described below.

The controller 36 manages the operation of the GPS reception/conversion unit 24, the environment sensing circuit 28, the multiplexer 30, the RF data-modem transmitter 32, the cellular telephone modem/data link circuit 34, and the RF data-modem receiver 40. An RF antenna 44 is coupled to the RF data-modem transmitter 32 for transmitting information to the base station 20. A timer 46 is coupled to the controller 36 and a power control 48. The power control 48 controls the supply of power to all the components of the field unit 16. The supply of power can be from a power source, such as a battery.

In one embodiment of the present invention, the elements of the field unit 16 are encapsulated in a strip-like mylar package that has a small profile, and which can be provided in a low-cost application. The package can have a first adhesive surface for contacting and adhering to a surface of a package or other object 18. As discussed previously, the field unit 16 can also optionally include transducers, sensors and detectors to measure environmental conditions.

In another embodiment of the present invention, the field unit 16 can be provided in the form of a conventional GPS receiver, that is, having a housing which houses all of its elements. The field unit 16 and its housing can be placed together with the object 18. Alternatively, the housing can include means for securing or adhering it to a surface of the object 18, or latch, strap or other similar mechanisms for allowing the housing to be worn by or strapped to an individual.

To save power and lengthen the life of the power source, it is possible to operate the field unit in a second mode of operation, as described in greater detail hereinbelow, where the field unit 16, except for its timer 46, is normally turned off except for those predetermined times when the timer 46 causes the remainder of the field unit 16 to turn on either to transmit information to a designated base station 20, or to wait for an interrogation signal IS from the base station 20. When the field unit 16 is not active, the power source is in a stand-by mode, which conserves power. When the timer 46 generates a "wake-up" signal to the remainder of the field unit 16, the power source switches to an operational mode, which provides sufficient power so that the circuit elements can operate. This active power management scheme conserves the life of the power source, and is especially suited for use with small-sized applications of the field unit 16, such as the thin, strip-like mylar package described above, where there is minimal on-board space for incorporating a larger power source, such as a battery.

Alternatively, a passive power management scheme that keeps the field unit 16 fully on at all times can also be employed. However, a passive power management scheme would need a power source having a longer life than an active scheme. Such a long-life power source can be a conventional alkaline battery, and this passive power management scheme is well-suited for use with a field unit 16 that contains a larger-sized housing into which the larger battery can be incorporated.

Figure 4:
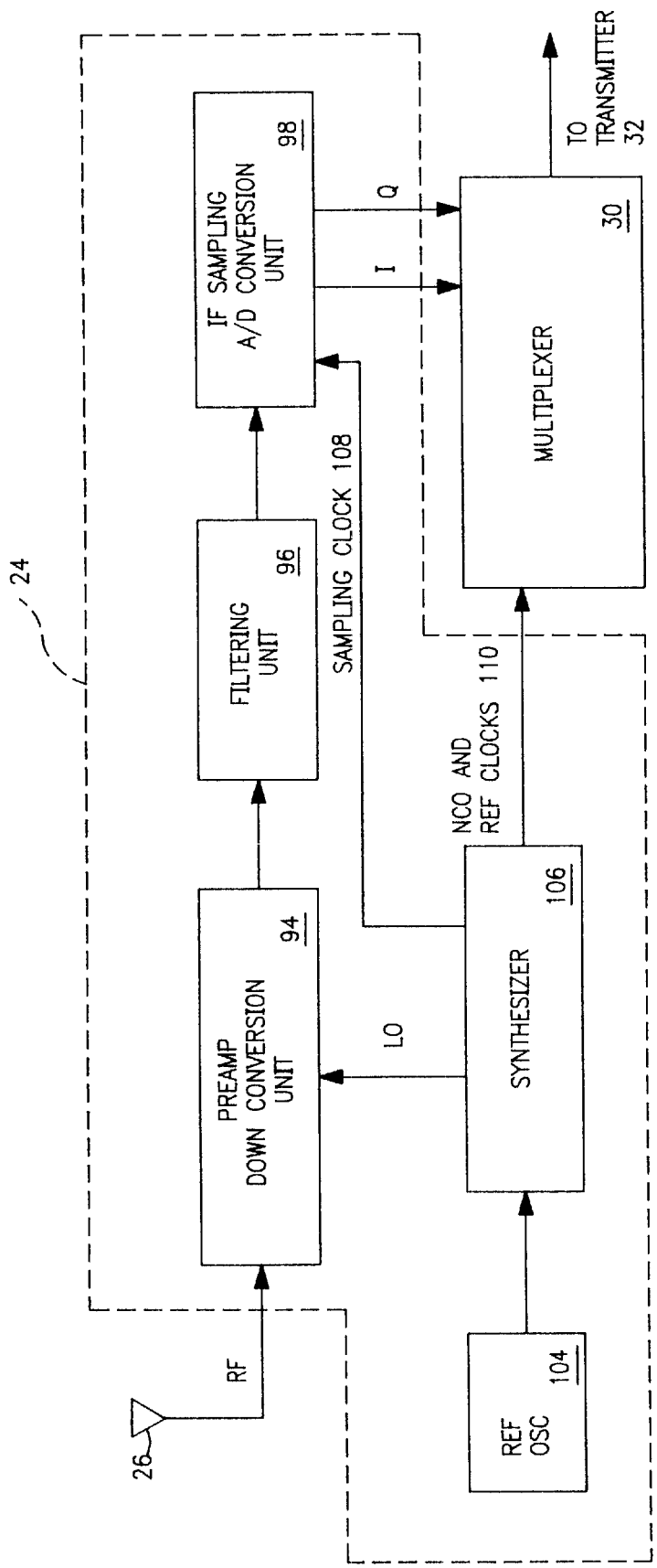
FIG. 4 is a simplified block diagram illustrating in greater detail the GPS reception/conversion unit of FIG. 2.

FIG. 4 is a block diagram illustrating in greater detail the GPS reception/conversion unit 24 of FIG. 2. The GPS reception/conversion unit 24, which is well known to those skilled in the art, includes mixers, amplifiers, synthesizers and analog-to-digital converters to perform the down-conversion. The GPS reception/conversion block 24 also includes a voltage-controlled oscillator 104 that is coupled to a crystal to generate a reference clock.

More specifically, the GPS reception/conversion unit 24 includes a synthesizer 106 that generates a local oscillator (LO) signal, a sampling clock 108, and control for a numerically controlled oscillator (NCO) and reference clocks 110 based on a reference clock provided by the reference oscillator 104. The Preamp Downconversion unit 94 receives the information signals from the satellites 14 via the antenna 26. Within the Preamp Downconversion unit 94, the preamplifier provides burnout protection, amplification of weak signals, filtering of out-of-band noise and signals, and down-conversion of the input signal by mixing it with the local oscillator signal to provide an intermediate-frequency (IF) signal. Subsequent filtering unit 96 provides attenuation of the undesired products (e.g., sidebands or images) of down-conversion. An IF Sampling A/D Conversion Unit 98 provides automatic gain control and analog-to-digital conversion. The IF Sampling A/D Conversion Unit 98 may also provide a second stage of down-conversion if the down-conversion is a two-step process in the receiver, in which case another filtering stage would be required. The IF Sampling and A/D Conversion Unit 98 then generates, in response to the sampling clock 108 from the synthesizer 106, I (i.e., in-phase or "real" data) and Q (i.e., quadrature or "imaginary") data that is transmitted to the multiplexer 30. Thus, the GPS reception/conversion unit 24 provides two channels (i.e., I and Q) of data and processing.

Figure 3:
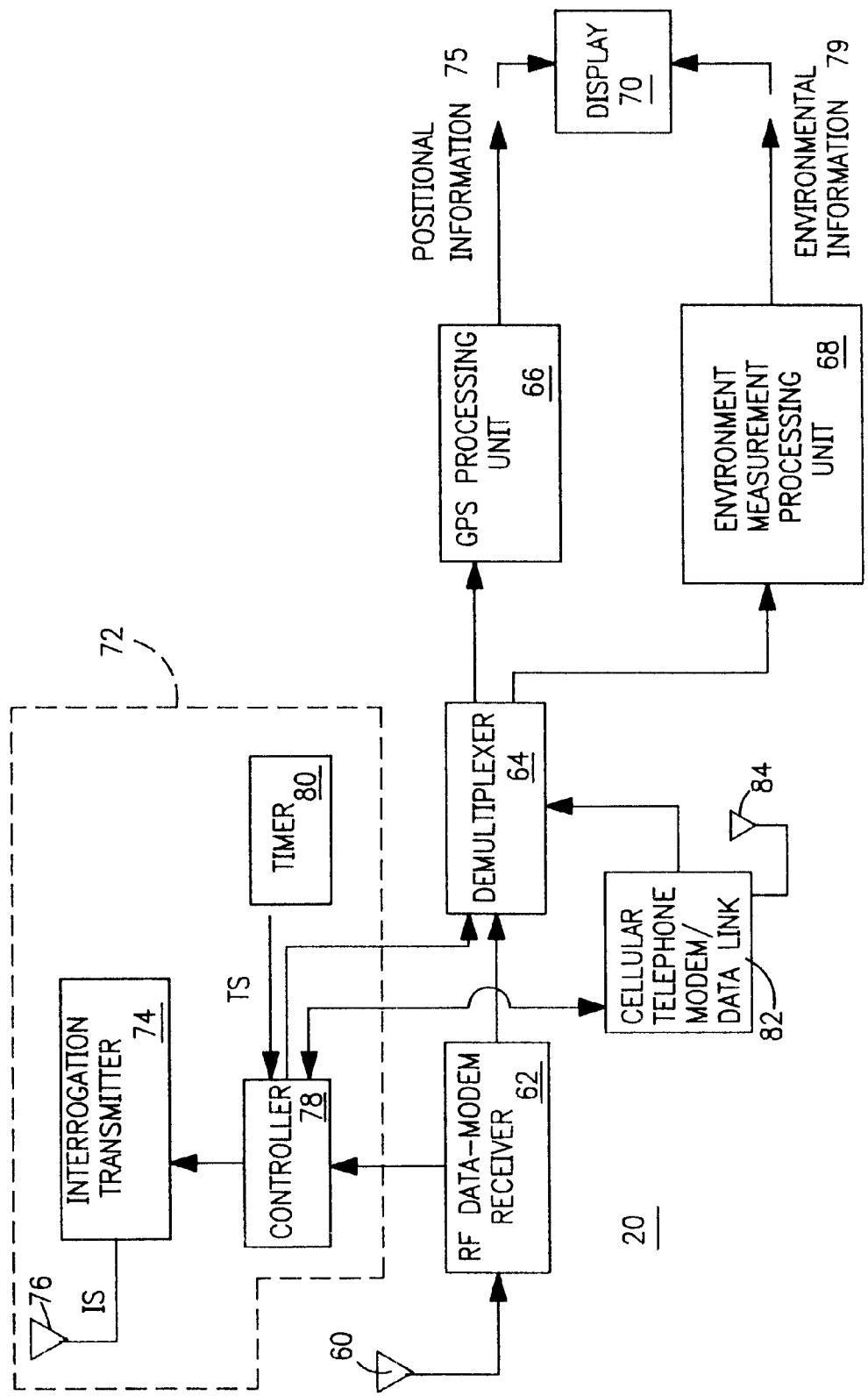
FIG. 3 is a simplified block diagram illustrating the base station of FIG. 1 configured in accordance with one embodiment of the present invention.

FIG. 3 is a simplified block diagram illustrating the base station 20 of FIG. 1 configured in accordance with one embodiment of the present invention. The base station 20 includes an antenna 60 operatively coupled to a RF data-modem receiver 62, a demultiplexer 64 and a GPS processing unit 66. The base station 20 receives and demultiplexes the signal transmitted by the field unit 16. The GPS processing unit 66 then performs conventional post IF processing to generate position and velocity information 75 of the field unit 16. An environmental measurement processing unit 68 is also coupled to the demultiplexer 64 to process environmental measurements 79 made by the environment sensing circuit 28. This position and environmental information relating to the field unit 16 can be displayed on a display device 70.

The base station 20 also includes an interrogation unit 72 that initiates the interrogation of the field unit 16. The interrogation unit 72 includes an interrogation transmitter 74 that transmits an interrogation signal IS to the field unit 16 via an antenna 76. A controller 78 is coupled to a timer 80 to receive timing signals TS. The controller 78 is also coupled to the interrogation transmitter 74 to cause the interrogation transmitter 74 to transmit interrogation signals IS at predetermined times, or at time intervals, that are based on the timing signals TS.

A cellular telephone modem/data link unit 82 is also connected to controller 78. If the field unit 16 attempts to communicate with the base station 20 via the cellular telephone modem/data link circuit 34 at the field unit 16, the cellular telephone modem/data link 82 at the base station 20 will receive signals from the field unit 16 via an antenna 84. The controller 78 will then instruct demultiplexer 64 to accept input data from cellular modem/data link 82 rather than from RF data-modem receiver 62.

Figure 5:
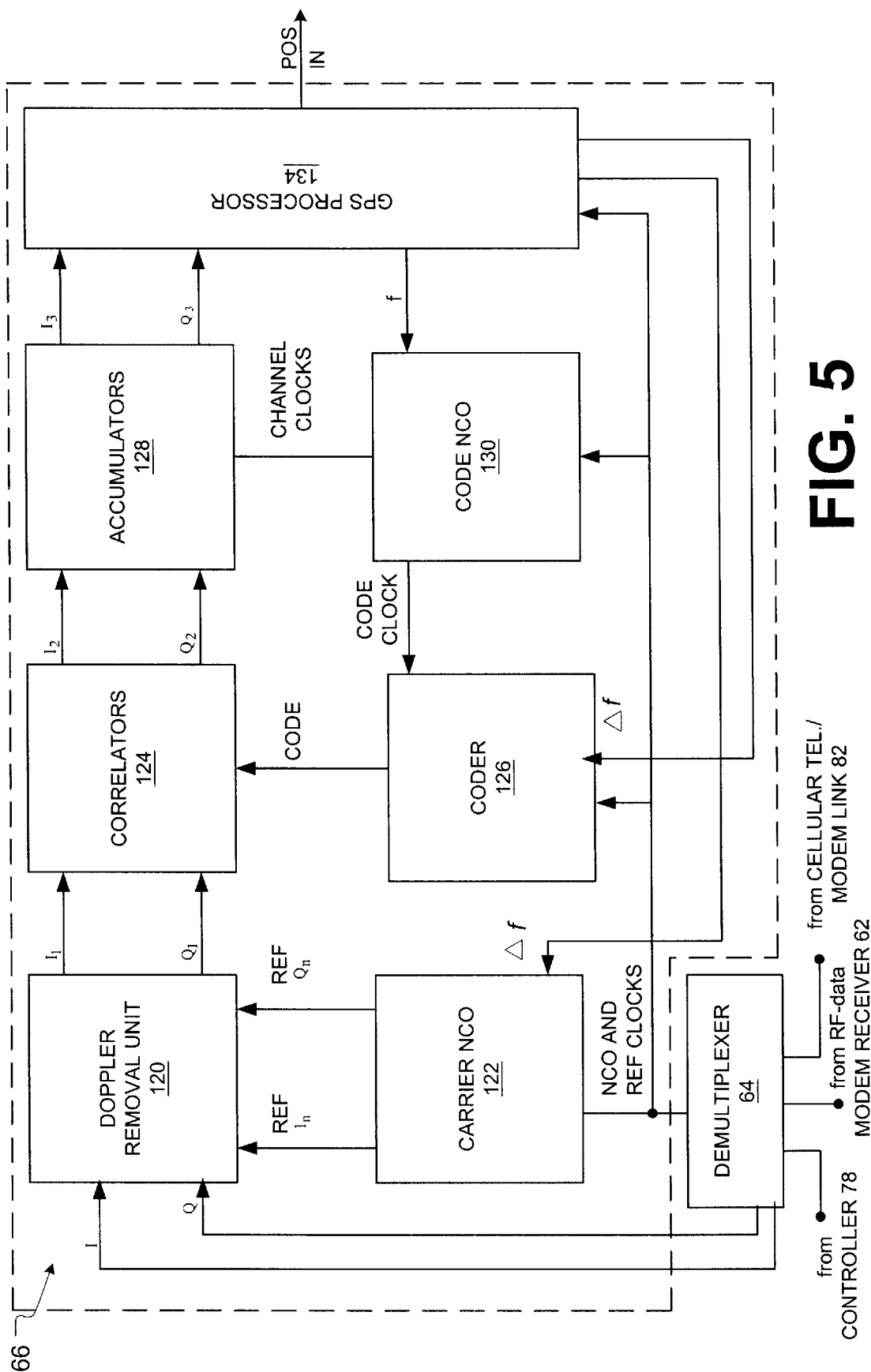
FIG. 5 is a simplified block diagram illustrating in greater detail the GPS processing unit of FIG. 3.

FIG. 5 is a block diagram illustrating in greater detail the GPS processing unit 66 of FIG. 3. The I and Q signals received from the field unit 16 are demultiplexed by the demultiplexer 64 and provided to a Doppler Removal (phase rotation) unit 120. The Doppler Removal (phase rotation) unit 120 multiplies the I and Q sequences by a 2×2 rotation matrix to account for phase errors due to doppler shift, system biases, and computational-roundoff noise. The code sequences on the resulting I and Q outputs from Doppler Removal (phase rotation) unit 120 are compared to early, punctual, or late sequences of the C/A code in correlator 124. The effects of the timing errors are integrated in the accumulator 128 of the first-order servo loop that closes through GPS processor 134. The error in GPS processor 134 generates the f parameter which determines the frequency of the code (NCO) oscillator 130. The f parameter is integrated in an accumulator that is permitted to overflow. The overflow reset signals provide the end-of-period timing pulses that define the "f-frequency" clock cycle periods. Similarly, delta f is accumulated in carrier NCO 122, but the accumulator values are integrated as the instantaneous phase angles of the I and Q sine and cosine outputs of carrier NCO 122. Coder 126 generates a replica of the C/A code. GPS processor 134 also decodes the outputs of the accumulator 128 to extract earth-centered coordinates of the satellite locations and the range to each of the satellites. From this information, it computes its own clock bias and location in earth-centered coordinates. Simple spherical transformations convert this information to latitude, longitude and altitude. The GPS processor 134 despreads, tracks and demodulates the data on the received signals. In other words, GPS processor 134 performs the digital signal processing (DSP) functions. Software can be employed to calculate position and velocity information from the satellite information. Software modules can include acquisition algorithms, tracking loops, lock detection, data recovery, measurement processing, receiver manager, data demodulation, navigation filtering, I/O and GPS interface, a standard API interface, and drivers for any PC applications. The GPS processor 134 and associated software are also known to those skilled in the art.

GPS receiver configuration and design are well known in the art. General principles and design concepts are set forth in *Global Positioning System: Theory and Applications*—Volumes I and II, B. W. Parkinson and J. J. Spilker, Jr., editors of Volumes 163 and 164 of the Progress in Astronautics and Aeronautics series, published by the American Institute of Aeronautics and Astronautics, Inc. In addition, the structure, functions and operations of the circuits illustrated in FIGS. 4 and 5 are described in greater detail in Chapter 78 of "GPS Receivers" by A. J. Van Dierendonck from *Global Positioning System: Theory and Applications*, Volume I, the entire disclosure of which is incorporated herein by reference.

Thus, although the individual functional units of FIGS. 4 and 5 are conventional and well-known in the art, the present invention employs a novel integration scheme that selectively integrates certain functional units in the field unit 16, while integrating other functional units in the base station 20. This can be implemented in a manner in which minimal processing is performed at the field unit 16, where power is scarce, while reserving the bulk of the processing for the base station 20, where power can be supplied more conveniently. This can also allow the field unit 16 to be provided at a low cost to the consumer, thereby allowing the system of the present invention to be used in a wider range of applications.

As briefly mentioned above, the system 10 of the present invention can operate in either a first mode of operation, where the base station 20 interrogates the field unit 16 at predetermined times, or at predetermined time intervals, to elicit a response from the field unit 16, or a second mode of operation, where no interrogation signals are received and the field unit 16 is programmed to initiate communication with a base station 20 at predetermined times, or at predetermined time intervals.

Figure 6:
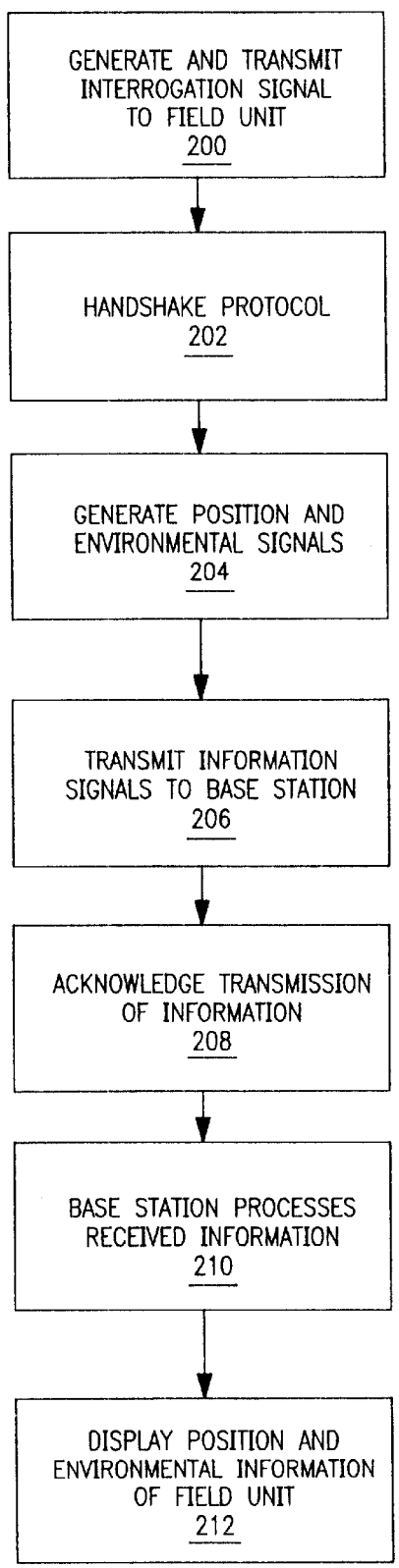
FIG. 6 is a flowchart that illustrates a first method of operation carried out by the system of the present invention.

FIG. 6 is a flowchart that illustrates the processing steps of the first mode of operation according to the present invention. The first mode of operation is especially effective where the field unit 16 is located in sufficiently close proximity to the designated base station 20 so that a conventional RF-link between the field unit 16 and the base station 20 can be maintained at all times.

In step 200, the controller 78 in the designated base station 20, responding to timing signals TS received from the timer 80, prompts the interrogation transmitter 74 to transmit an interrogation signal IS (via the antenna 76) to the field unit 16. If the field unit 16 is within the RF range of the base station 20, the interrogation signal IS will be received by the RF data-modem receiver 40 of the field unit 16 (via the antenna 42). The interrogation signal IS can optionally include a request for additional environmental information, such as altitude, temperature, or contents, for example. Alternatively, the field unit 16 can be programmed to generate and transmit a predetermined set of additional environmental information in response to all interrogation signals.

If the field unit 16 is operating under an active power management scheme, the timer 46 of the field unit 16 detects a predetermined time interval during which it can expect to receive an interrogation signal IS, and turns on the power control 48 to "wake-up" the elements of the field unit 16 to await the reception of the interrogation signal IS. If the field unit 16 is operating under a passive power management scheme, the elements of the field unit 16 will always be "on" and therefore ready to receive an interrogation signal IS.

"Handshaking" is now performed in step 202. The RF data-modem receiver 40 relays to controller 36 the "handshake" code received from interrogation transmitter 74. The "handshake" response from field unit 16 is initiated in controller 36, propagates through multiplexer 30, RF data-modem transmitter 32 and antenna 34 to the base station 20. The "handshake" response signal is received by antenna 60 and RF data-modem receiver 62, then relayed to the controller 78 where the "handshake" sequence originated. Information may loop through this "handshake" system several times until communication units at both the base station 20 and the field unit 16 are fully synchronized with one another. At this time, the field unit 16 is ready to transmit information signals to the base station 20.

After the "handshake" protocol between the field unit 16 and the base station 20 has been established, in step 204, the controller 36 causes the GPS reception/conversion unit 24 to receive position signals from the GPS satellites 14 via the antenna 26.

In step 206, the requested information is provided to the RF data-modem transmitter 32 for RF-link transmission via RF antenna 44 to the base station 20. The controller 36 also causes the environment sensing circuit 28 to generate and process the desired environmental information. In this step, the position signals from the GPS satellites 14 and data from the environment sensing circuit 28 are multiplexed via multiplexer 30 and are passed to the RF data-modem transmitter 32.

In step 208, the requested information is received by the RF data-modem receiver 62 at the base station 20. The controller 78 can then communicate with the field unit 16 via the interrogation transmitter 74, antenna 76, antenna 42, and the RF data-modem receiver 40 to acknowledge receipt of the requested information.

In step 210, the requested information is processed by demultiplexing the received information to the GPS processing unit 66 and the environment measurement processing unit 68 for processing. In step 212, the positional information 75 from the GPS processing unit 66 and the environmental information 79 from the environment measurement processing unit 68 are displayed at the display 70.

Figure 7:
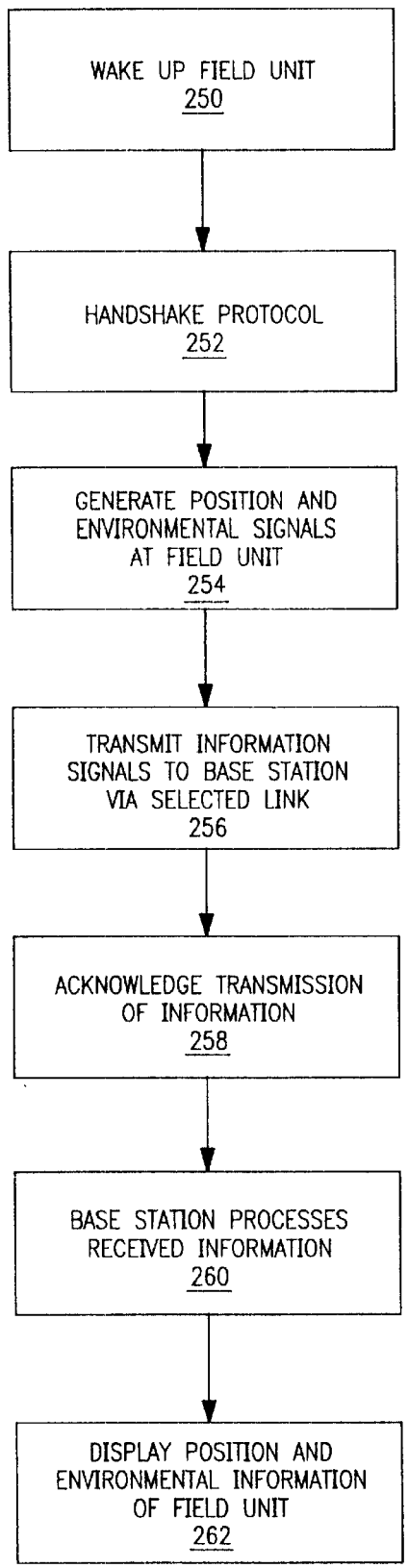
FIG. 7 is a flowchart that illustrates a second method of operation carried out by the system of the present invention.

FIG. 7 is a flowchart that illustrates the processing steps of the second mode of operation according to the present invention. The second mode of operation is especially well-suited for use where the field unit 16 may be travelling to a location where a conventional RF-link between the field unit 16 and the designated base station 20 cannot be maintained at all times, or where active power management scheme is desirable to conserve the life of the power source at the field unit 16.

In step 250, the timer 46 of the field unit 16 detects the predetermined time at which a communication is to be made with the designated base station 20, and turns on the power control 48 to "wake-up" the elements of the field unit 16. This predetermined time can be one of a plurality of arbitrarily pre-programmed times, or can be pre-programmed times between specified time intervals.

"Handshaking" is performed in step 252. Standard protocols (similar to those for step 202 in the first mode of operation) are used to initiate the "handshaking" procedure over the RF link with the base station 20. If the procedure is successful, the multiplexer-output data will be transmitted to the base station 20 via the RF data-modem transmitter 32 and RF data-modem receiver 62. If the procedure is unsuccessful (which may mean that the field unit 16 is out of the RF transmission range of the base station 20), the field unit 16 will then place a cellular phone call to the base station 20 and the "handshaking" procedure over the cellular telephone modem/data link circuits 34 and 82 is initiated using standard protocols. If the cellular link is successful, the multiplexer-output data will be transmitted to the base station 20 over the cellular telephone modem/data link circuits 34 and 82. If the attempted cellular link is unsuccessful, the field unit 16 will shut down and try to re-establish a communication link with the base station 20 at a later time.

In step 254, the controller 36 responds to the timer 46 by causing the GPS reception/conversion unit 24 to receive position signals from the GPS satellites 14 via the antenna 26. The controller 36 also causes the environment sensing circuit 28 to generate and process the desired environmental information. The controller 36 can be programmed to request a specific set of environmental information at all times, or to request different sets of environmental information at different times.

In step 256, the desired position and environmental information is provided to the RF data-modem transmitter 32 or the cellular telephone modem/data link circuit 34 for transmission to the base station 20. In this step, the position signals from the GPS satellites 14 are passed to the appropriate link via the multiplexer 30. If environmental information is also to be transmitted, the controller 36 causes the multiplexer 30 to multiplex and pass the position signals and the environmental information to the appropriate link.

In step 258, the information is received at the demultiplexer 64. The controller 78 can then communicate with the field unit 16 to acknowledge receipt of the requested information.

In step 260, the received position and environmental information are processed by demultiplexing the received information to the GPS processing unit 66 and the environment measurement processing unit 68 for processing.

In step 262, the positional information 75 from the GPS processing unit 66 and the environmental information 79 from the environment measurement processing unit 68 are displayed at the display 70.

The two methods described above can be further modified to provide a number of more comprehensive communication schemes. As a non-limiting example, a communication network can consist of one central base station that is adapted to control a plurality of regional base stations 20 that are permanently located in different regions through the country. A field unit 16 is attached to an object 18, such as a package, that is being transported across the country. During the field unit's 16 journey, it will pass through a number of different regions, each region being monitored by one of the regional base stations 20. When the field unit 16 travels through a first region, it will communicate with the first regional base station 20a according to any of the operation modes described above. When the field unit 16 crosses from the first region into a second region, the central base station can instruct the second regional base station 20b to communicate with the field unit 16. This process can be repeated for as many regions as the field unit 16 travels through. If at any time the field unit 16 is not able to communicate with one of the regional base stations 20, the controller 36 in the field unit 16 can be programmed to establish a cellular link with the central base station. Upon establishing the cellular link with the central base station, the central base station can then determine which regional base station 20 should be instructed to resume communications with the field unit 16.

Thus, the present invention provides a system and method that permits comprehensive communication between a field unit 16 and one or more base stations 20. The communication can be continuously maintained through conventional RF-link, or through longer-range cellular or other data link, without regard to the location of the field unit 16. The system and method of the present invention further facilitates the generation and transmission of certain variable and known environmental information. One important result that is realized by the system and method of the present invention is the integration of particular functional units in the field unit 16 and in the base station 20, thereby allowing processing to be minimized at the field unit 16 and reducing the cost of the field unit 16 to the consumer.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A system for monitoring a field unit associated with a predetermined object, comprising:
    a GPS reception unit configured to receive position information from a plurality of GPS satellites;
    an environmental circuit configured to sense environmental conditions and produce an environmental signal representative of the environmental conditions
    a transmitter configured to transmit the position information and the environmental signal via radio frequency communications upon interrogation from a base station;
    said transmitter is further configured to initiate communications with a base station and transmit the position information and the environmental signal via cellular communications where said field unit is outside a predetermined range from said base station;
    the environmental circuit comprises a memory storage for storing object information pertaining to the object;
    the environmental signal further comprises data representing the object information stored in the memory storage; and wherein the reception unit, the environmental circuit and the transmitter reside in the field unit.

2. The system of claim 1, wherein the environmental circuit senses ambient temperature and produces the environmental signal which is representative of the ambient temperature.

3. The system of claim 1, wherein the environmental circuit senses ambient humidity and produces the environmental signal which is representative of the ambient humidity.

4. The system of claim 1, wherein the environmental circuit senses ambient altitude and produces the environmental signal which is representative of the ambient altitude.

5. The system of claim 1, wherein the environmental circuit senses ambient pressure and produces the environmental signal which is representative of the ambient pressure.

6. The system of claim 1, further comprising a base station receiver, wherein the position information and the environmental signal are transmitted from the field unit to the base station.

7. The system of claim 6, wherein the transmitter is configured to transmit a cellular phone signal and a radio frequency (RF) signal which are representative of the position information and the environmental signal, and wherein the base station receiver is configured to receive the cellular telephone signal and the RF signal, such that the transmitter will transmit the RF signal when in an RF range of the base station and will transmit the cellular signal when out of the RF range of the base station so as to maintain contact with the base station independent of location of the field unit and the base station.

8. The system of claim 6, wherein the base station further includes a GPS processing unit configured to process the position information received from the field unit, and an environmental measurement processing unit configured to process the environmental signal received from the field unit.

9. The system of claim 1, wherein the field unit further includes a GPS processing unit configured to process the position information received from the plurality of GPS satellites, and an environmental measurement processing unit configured to process the environmental signal produced by the environmental circuit.

10. The system of claim 1, further including an interrogation circuit configured to generate an interrogation signal, and wherein the field unit further includes a receiver configured to receive the interrogation signal, wherein the field unit transmits the position information and the environmental signal upon receipt of the interrogation signal.

11. The system of claim 10, further comprising a base station, wherein the interrogation circuit resides within the base station.

12. The system of claim 1, wherein the field unit further includes a timing circuit such that the field unit transmits the position information and the environmental signal at an at least one predefined time.

13. The system of claim 1, wherein the field unit is encased in a mylar package.

14. The system of claim 13, wherein the field unit is fixable to a person.

15. The system of claim 13, wherein the field unit is fixable to an animal.

16. The system of claim 13, wherein the field unit is fixable to an object.

17. The system of claim 13, wherein the field unit is fixable to a package, such that the field unit transmits the position information and the environmental signal when the package is enroute to a predefined destination.

18. The system of claim 1, further comprising a memory residing in the field unit whereby the position information and the environmental information may be saved and transmitted at a later time.

19. The system of claim 1, further comprising a field unit power source and a power management scheme residing in the field unit, whereby the power management scheme conserves the use of power in the power source.

20. The system of claim 19, wherein the power management scheme is active.

21. The system of claim 19, wherein the power management scheme is passive.

22. A system for monitoring a field unit according to claim 1, wherein said object information comprises data identifying the object.

23. A system for monitoring a field unit according to claim 1, wherein said object information comprises data representing the name of the object.

24. A system for monitoring a field unit according to claim 1, wherein said object information comprises data representing the contents of the object.

25. A system for monitoring a field unit according to claim 1, wherein said object information comprises data representing the weight of the object.

26. A system for monitoring a field unit according to claim 1, wherein said object information comprises data representing the destination of the object.

27. A system for monitoring a field unit according to claim 1, wherein said object information comprises data representing the origin of the object.

28. A system for monitoring a field unit according to claim 1, wherein the field unit is associated with the predetermined object by attachment to the object.

29. A system for monitoring a field unit according to claim 13, wherein said mylar package is substantially planar in shape.

30. A system for monitoring a field unit associated with an object, comprising:
- means for receiving position information from a plurality of GPS satellites;
- means for sensing environmental conditions;
- means for producing an environmental signal representative of the environmental conditions comprising a storage means for storing object data pertaining to said object;
- means for transmitting the position information, object data and the environmental signal via radio frequency communications upon interrogation from a base station; and
- said means for transmitting is further configured to initiate communications with a base station and transmit said position information, object data and environmental signal via cellular communication where said field unit is outside a predetermined range from said base station.

31. The system of claim 30, wherein the means for sensing senses ambient temperature and the means for producing produces the environmental signal which is representative of the ambient temperature.

32. The system of claim 30, wherein the means for sensing senses ambient humidity and the means for producing produces the environmental signal which is representative of the ambient humidity.

33. The system of claim 30, wherein the means for sensing senses ambient altitude and the means for producing produces the environmental signal which is representative of the ambient altitude.

34. The system of claim 30, wherein the means for sensing senses ambient pressure and the means for producing produces the environmental signal which is representative of the ambient pressure.

35. The system of claim 30, further comprising a means for receiving the transmitted position information and the environmental signal at a base station.

36. The system of claim 35, wherein the means for transmitting transmits a cellular phone signal and a radio frequency (RF) signal which are representative of the position information and the environmental signal, and further including a means for receiving at the base station the cellular telephone signal and the RF signal, such that the means for transmitting will transmit the RF signal when in an RF range of the base station and will transmit the cellular signal when out of the RF range of the base station so as to maintain contact with the base station independent of location of the field unit and the base station.

37. The system of claim 35, wherein the base station further includes a means for processing the position information and a means for processing the environmental signal received from the field unit.

38. The system of claim 30, further including a means for processing by the field unit the position information and the environmental signal.

39. The system of claim 30, further including a means for generating an interrogation signal at a base station, and wherein the field unit further includes a means for receiving the interrogation signal, wherein the means for transmitting transmits the position information and the environmental signal upon receiving the interrogation signal.

40. The system of claim 30, wherein the field unit further includes a means for timing such that the means for transmitting transmits the position information and the environmental signal at an at least one predefined time.

41. The system of claim 30, wherein the field unit is encased in a mylar package.

42. The system of claim 41, wherein the field unit further includes a means for affixing to a person.

43. The system of claim 41, wherein the field unit further includes a means for affixing to an animal.

44. The system of claim 41, wherein the field unit further includes a means for affixing to an object.

45. The system of claim 41, wherein the field unit further includes a means for affixing to a package, such that the means for transmitting transmits the position information and the environmental signal when the package is enroute to a predefined destination.

46. The system of claim 30, further comprising a means for saving the position information and the environmental information such that the means for transmitting may transmit the position information and the environmental information at a later time.

47. The system of claim 30, further comprising a means for conserving a field unit power source and a means for managing power used by the field unit, whereby the use of power is conserved.

48. The system of claim 47, wherein the means for managing power is active.

49. The system of claim 47, wherein the means for managing power is passive.

50. A system for monitoring a field unit according to claim 41, wherein said mylar package is substantially planar in shape.

51. A system for monitoring a field unit, comprising the steps of:
- receiving position information from a plurality of GPS satellites;
- sensing environmental conditions;
- retrieving object data representing information pertaining to an associated object;
- producing an environmental signal representative of the environmental conditions and the object data; and
- transmitting the position information and the environmental signal upon interrogation from a base station and where said field unit is outside a predetermined range from said base station, initiating cellular communications with said base station to transmit said position information and said environmental signal.

52. The system of claim 51, wherein the step of sensing senses ambient temperature and the step of producing produces the environmental signal which is representative of the ambient temperature.

53. The system of claim 51, wherein the step of sensing senses ambient humidity and the step of producing produces the environmental signal which is representative of the ambient humidity.

54. The system of claim 51, wherein the step of sensing senses ambient altitude and the step of producing produces the environmental signal which is representative of the ambient altitude.

55. The system of claim 51, wherein the step of sensing senses ambient pressure and the step of producing produces the environmental signal which is representative of the ambient pressure.

56. The system of claim 51, further comprising the step of receiving the transmitted position information and the environmental signal at a base station.

57. The system of claim 56, wherein the step of transmitting transmits a cellular phone signal and a radio frequency (RF) signal which are representative of the position information and the environmental signal, and further including the step of receiving at the base station the cellular telephone signal and the RF signal, such that the step of transmitting will transmit the RF signal when in an RF range of the base station and will transmit the cellular signal when out of the RF range of the base station so as to maintain contact with the base station independent of location of the field unit and the base station.

58. The system of claim 56, further including at the base station the step of processing the position information and a step of processing the environmental signal received from the field unit.

59. The system of claim 51, further including the step of processing by the field unit the position information and the environmental signal.

60. The system of claim 51, further including the step of generating an interrogation signal at a base station, and wherein the field unit further includes the step of receiving the interrogation signal, wherein the step of transmitting transmits the position information and the environmental signal upon receiving the interrogation signal.

61. The system of claim 51, wherein the field unit further includes the step of timing such that the step of transmitting transmits the position information and the environmental signal at an at least one predefined time.

62. The system of claim 51, further comprising the step of saving the position information and the environmental information such that the step of transmitting may transmit the position information and the environmental information at a later time.

63. The system of claim 51, further comprising the step of conserving a field unit power source and the step of managing power use by the field unit, whereby the use of power is conserved.

64. The system of claim 63, wherein the step of managing power is active.

65. The system of claim 63, wherein the step of managing power is passive.

66. A field unit comprising:

a GPS reception unit configured to receive position information from a plurality of GPS satellites;

an environmental circuit configured to sense environmental conditions and produce an environmental signal representative of the environmental conditions;

a transmitter configured to transmit the position information and the environmental signal via connection radio frequency communications upon interrogation from a base station;

said transmitter is further configured to initiate communications with a base station via cellular communications where said field unit is outside a predetermined range from said base station;

the environmental circuit comprises a memory storage for storing object information pertaining to the object;

the environmental signal further comprises data representing the object information stored in the memory storage;

wherein the reception unit, the environmental circuit and the transmitter reside in the field unit; and wherein the field unit is associated with a predetermined object.

67. A field unit according to claim 66, further comprising a mylar package which encases said field unit.

68. A field unit according to claim 67, wherein said mylar package is substantially planar in shape.

69. A field unit according to claim 66, wherein said object information comprises data identifying the object.

70. A field unit according to claim 66, wherein said object information comprises data representing the name of the object.

71. A field unit according to claim 66, wherein said object information comprises data representing the contents of the object.

72. A field unit according to claim 66, wherein said object information comprises data representing the weight of the object.

73. A field unit according to claim 66, wherein said object information comprises data representing the destination of the object.

74. A field unit according to claim 66, wherein said object information comprises data representing the origin of the object.

75. A field unit according to claim 68, wherein said object comprises a shipping container.

76. A field unit according to claim 68, wherein said object comprises a mailing envelope.

77. A field unit according to claim 66, wherein said field unit is associated with said predetermined object by attachment to said object.

* * * * *